Jan. 21, 1969     R. C. JONES     3,423,694
RADIANT ENERGY SOURCE
Filed Aug. 26, 1964
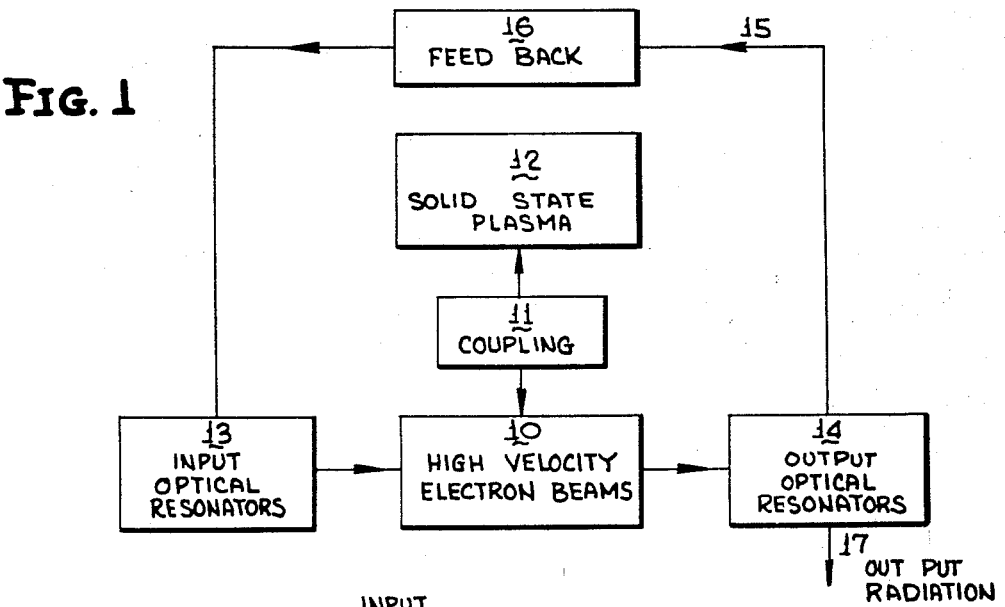
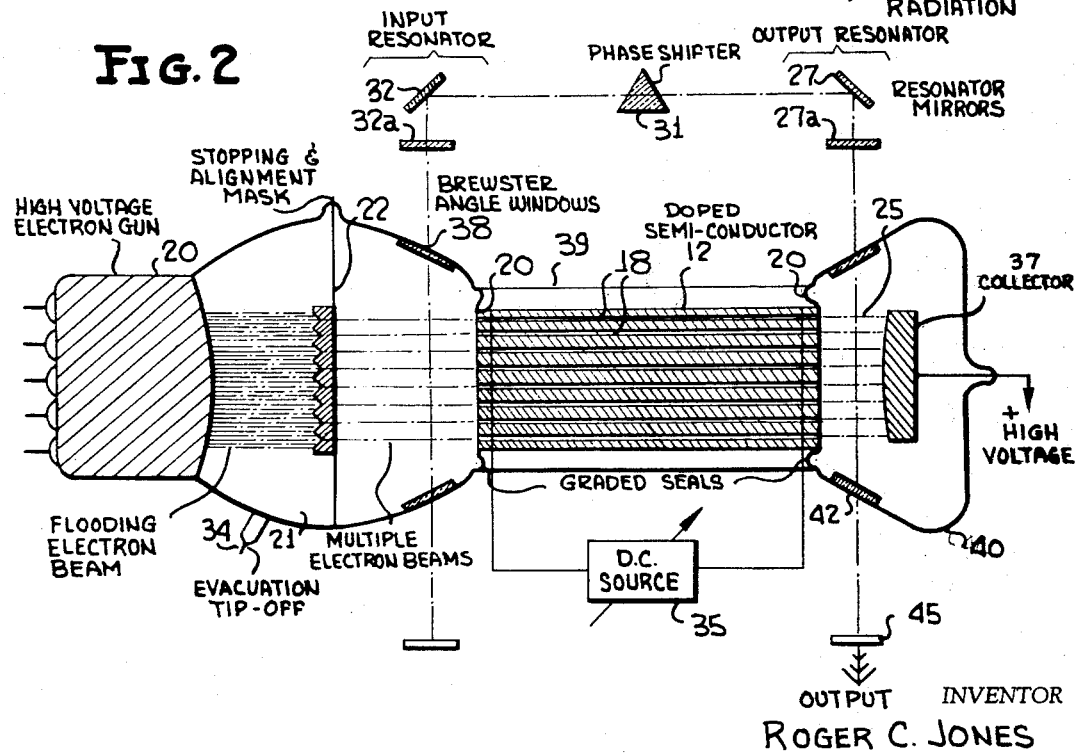
INVENTOR
ROGER C. JONES
BY *Hurvitz & Rose*
ATTORNEYS United States Patent Office 3,423,694
Patented Jan. 21, 1969

3,423,694
RADIANT ENERGY SOURCE
Roger C. Jones, Springfield, Va., assignor to Melpar, Inc., Falls Church, Va., a corporation of Delaware
Filed Aug. 26, 1964, Ser. No. 392,162
U.S. Cl. 331—94.5                 11 Claims
Int. Cl. H01s 3/00

ABSTRACT OF THE DISCLOSURE

A coherent radiant energy source includes a semiconductor body having a plurality of parallel passageways extending therethrough to simulate vacant regions in a plasma confined within the semiconductor body. Beams of velocity-modulated electrons are directed through the passageways to set up interactions within the passageways between the near fields of the beams and the plasma, the latter being subjected to an electric field to produce a drift of charge carriers therein along paths parallel to the passageways. Velocity modulation of the electron beams is produced by use of optical resonators at either end of the semiconductor body to couple radiant energy emanating from the "output" end of the body back to the "input" end in a favorable phase relationship, with adjustability of the wavelength of the radiant energy according to the desired frequency of the coherent energy to be radiated.

---

The present invention relates to radiant energy sources and more particularly to radiant energy sources wherein controlled interaction between a separated electron beam-plasma produces coherent generation of wave energy therefrom.

The extremely wide range of the electromagnetic spectrum does not admit of a single mechanism which may be utilized to achieve generation of radiation throughout the spectrum. Thus, for example, the generation of energy in the R-F portion of the spectrum has been provided by such devices as electromechanical resonators, and L-C, vacuum tube, transistor, and spark-excited oscillators. Some of these devices have been constructed with radiation generation capability within the Hertzian region, and more particularly to produce oscillations of wavelengths of the order of one centimeter (10,000 microns). In the visible light and higher frequency regions of the spectrum (wavelengths of the order of one micron or less) radiation is produced by vibrations within the atomic structure. The advent of the maser has led to the subsequent development of a variety of devices which operate by stimulated or induced emission of radiation in regions of the spectrum other than merely the microwave region. A notable example of such later devices is the laser, an optical maser, which may operate in the visible spectrum and in the lower portion of the infrared region of the spectrum. Briefly, and in simplified terms, such operation may be characterized by the subjection of the maser to sufficient radiation, or to an external field, of a pumping frequency to achieve a forced or induced transition between certain energy states or levels and a resultant induced emission of coherent radiation from the upper pumped state to some lower state, mixed with some incoherent radiation caused by spontaneous or random emission. The frequency $f_{ji}$ of the emitted coherent radiation is restricted or limited to the values $$f_{ji} = \frac{E_j - E_i}{h} = \frac{E_{ji}}{h} \quad (1)$$

where $E_j$ and $E_i$ are energies existing at states $j$ and $i$ respectively, $E_{ji}$ is the energy difference between states $j$ and $i$, and $h$ is Planck's constant. Such restriction of frequency values is explained by the quantum theory of spectra, i.e., discrete permitted energy levels existing in atoms or molecules such that transition from one level to another is marked by the absorption or radiation of energy of a frequency related to the change of energy level. Furthermore, lasers have an upper wavelength limit of approximately 10 microns for the generation of any appreciable power. Extremely low power lasers may operate up to 85 microns. The present state of the art is such that no device exists for generating coherent radiation throughout the infrared region of the spectrum, i.e., approximately 1 to 1000 microns.

Through utilization of a separated particle beam-plasma, however, practical amplifiers and oscillators are obtained for operation at these extremely high frequencies. While beam-plasma amplifiers per se are known, they have heretofore been incapable of generating coherent radiation over the above-noted region of the spectrum. It is the separated beam-plasma of the present invention which permits sufficiently high charged particle densities, and more particularly extremely high electron densities, in the plasma for operation over this region. Although in the following description reference is made to high velocity electron beams, it is to be understood that other particle beams may be employed to permeate the "vacant regions" of the plasma to provide the desired separated beam-plasma operation.

In accordance with the present invention, a space charge wave on an electron beam is directed through a plasma-carrying medium and interacts with a plasma having a mobility controlled array of charge carriers, the plasma oscillation frequency being dependent upon charge carrier density. Intercoupling of the near fields of the two oscillating charge distributions produces a set of space charge waves, one of which grows exponentially with distance in the direction of travel of the electron beam. By appropriate selection of the velocity modulation characteristics of the beam and apropriate control of plasma charge carrier mobility, coherent radiant energy of a wavelength of the order of the plasma oscillation frequency may be derived from the growing wave. Thus, radiant energy generated in accordance with the present invention may have wavelengths approaching the wavelengths attained by lasers, but independently of laser principles of operation. Therefore, the present invention is not limited to discrete frequencies but is capable of producing radiation of continuously variable frequencies throughout a predetermined region of the spectrum, and more particularly throughout portions of the infrared region for which sources of radiation have heretofore been unavailable.

It is, therefore, a principal object of the present invention to overcome one or more of the above-mentioned disadvantages of prior art sources of coherent radiant energy.

It is a more specific object of the present invention to provide a source of coherent radiation of a wavelength which may be varied continuously throughout a preselected region of the spectrum for which no sources have previously been available.

It is a further object of the present invention to provide a source of radiant energy within the infrared region of the spectrum which is not dependent upon laser principles of operation.

It is another object of the present invention to provide controlled interaction of a plasma and a charged particle beam to generate radiant energy within a preselected region of the spectrum.

Other objects, features, and attendant advantages of the present invention will become apparent from a consideration of the following specification taken in conjunction with the accompanying drawing in which:

FIGURE 1 is a functional block diagram of a circuit in accordance with the present invention.

FIGURE 2 is a diagram of a preferred embodiment of the present invention.

Referring now to the drawing wherein like reference numerals are used to refer to like elements, FIGURE 1 is illustrative of the principles involved in the present invention. A modulated electron beam 10 supplies energy to a plasma carrying medium 12 via coupling path 11. While path 11 is shown as a single coupling for purposes of convenience and simplicity, it will be understood that the path is appropriate to the energy supplied by the source (not shown) of the beam and to the desired wavelength of the radiant energy to be produced and, for example, may be a free space path. The interaction of the modulated electron beam 10 and the plasma carried by medium 12 produces energy which is at least partially applied to output resonator 14 via a suitable path, again, for example, free space. The resonant energy provided by resonator 14 is suitably applied through an appropriate feed-back link 16 via a suitable path 15, for example an optical path, to modulate the electron beam, through input resonator 13, at the desired resonant frequency. The modulated beam and resonator fields are intercoupled to thereby provide output radiant energy of the desired wavelength via the resonator 14 and a suitable directive path 17, for example an optical path.

Referring now to FIGURE 2, a preferred but non-limiting embodiment of the present invention will now be described. A semiconductor 12 is employed as a plasma-carrying medium by appropriate doping thereof with both n-type, i.e., donor, and p-type, i.e., acceptor, impurities to produce a plasma within the semiconductor.

As is well known, a plasma comprises a relatively homogeneous distribution of "particles" such as ions, electrons, holes, neutral atoms and molecules, the distribution rendering the plasma effectively electrically neutral by virtue of the fairly extreme potentials which would otherwise result. Motion of the particles is essentially determined by electromagnetic interactions occurring when the microscopic electrostatic shielding distance is small compared to the dimensions of the plasma, and produces a plasma frequency proportional to the density of the free electrons or holes. While other plasma-carrying mediums may be utilized, the semiconducting medium is preferred. Such a solid state medium is desirable for attainment of extremely high frequencies. Doping may be accomplished by any conventional method of dispersing impurities into the semiconductor, such as by diffusion techniques, and is controlled to provide a suitable density of electrons and holes. For purposes of simplicity and convenience, the semiconductor is represented as having a cylindrical shape. However, any desired dimensions or shape may be used. The semiconductor is provided with a plurality of parallel apertures or passageways 18 extending the length thereof, and which in the preferred embodiment are parallel to the axis of the cylinder. The diameters of the apertures and separations between apertures are as small as possible for reasons to be hereinafter described. Present state of the art limitations as to methods of providing such apertures impose minimum diameters and separations of approximately three microns. A pair of metal electrodes 19, for example collector rings, are attached to either end of the semiconductor 12.

A suitable source 20, for example a high-voltage, high-current electron gun having appropriate focusing means (not shown), provides a high velocity electron beam to which the semiconductor 12 is subjected. Thus, in the preferred embodiment the electron gun and its associated focusing means are employed to direct a flood beam of electrons toward a stopping and alignment mask 22 placed normal to the axis of the apertures 18 and in the beam path between source 20 and semiconducting medium 12.

Apertures are provided in alignment mask 22 to correspond to and register with those in semiconductor 12 such that a plurality of intense, high velocity electron beams traverse apertures 18, simulating "vacant regions" of the semiconductor.

A resonant cavity region 25, under the control of suitable resonators, e.g., 27, is provided to couple radiant energy back to the original electron beam, via a suitable feedback arrangement, to produce desired velocity modulation of the electron beams traversing the apertures. A suitable form of optical resonator is a set of mutually orthogonal Fabry-Perot resonators, a form of Fabry-Perot interferometer, well known in the optical art. The resonator surround the cavity region 25 to prevent energy from escaping therebetween. Feedback is accomplished by directing a portion of the energy from the resonant cavity via resonator angled mirror 27 and through a suitable optical phase shifting element 31 to another angled mirror of input resonator 32. Thus, the resonating energy is directed back to the electron beam through a second set of mutually orthogonal resonators. Self-sustaining resonance is produced as a result of the feedback and of the adjustment of the Fabry-Perot resonators to provide the desired resonant frequency.

In order to set or change the frequency of oscillation of the traversing electron beams, each resonator is adjustable to controllably vary the distance between mirrored surfaces thereof, and, to this end, each is of different optical length to provide operation at different mode numbers. Configuration and characteristics of Fabry-Perot resonators are well-known in the art of optics and need not be further discussed. It is sufficient to note that each resonator essentially comprises a pair of mirrors having adjacent plane faces of approximately 98 to 99 percent reflectance, the separation between these faces being adjustable. Two sets of mutually orthogonal resonators are provided, a first set to enclose the cavity region 25 and a second set to enclose the region in which the electron beam enters the semiconductor apertures 18, for example between alignment mask 22 and the adjacent face of semiconductor 12, in such manner as to prevent radiation losses at the ends establishing output and input of the device respectively. It is to be understood that the optical path comprising resonators, angled-mirrors, and phase-shifter may be so arranged to completely enclose the input and output regions or to provide paths at predetermined portions thereof, and that a single path is shown for purposes of clarity only.

Preferably, an adjustable source of direct voltage 35 is connected across electrodes 19 to provide an electric field through the semiconductor in a direction substantially parallel to the axes of apertures 18. The electric field produces a drift or migration of free electrons and holes of the plasma through semiconducting region 12. To provide greater control of charge carrier, i.e., electron-hole, mobility the semiconducting region is suitably cooled, for example by immersing the entire device in liquid helium or by providing a special cooling jacket, such as 39, about the semiconductor. The cooling temperature will be determined by the desired wavelength of radiant energy as will hereinafter be explained.

Those regions of the embodiment of FIGURE 2 which are traversed by the electron beam provided by source 20 may be suitably evacuated to permit maintenance of an essentially constant velocity beam, at least within the "vacant regions" 18 of the semiconductor. To provide a suitable vacuum, the enclosures 21 and 40 may be employed as a glass sealed vacuum housing, and evacuation of the atmosphere within the housing and apertures 18 may be accomplished by provision of an outlet 34 to a vacuum pump (not shown). Such an arrangement is purely exemplary, and any conventional means for providing a vacuum may be employed as desired. However, it is necessary with any vacuum arrangement utilized that the optical feedback path be unobstructed as, for example, by providing Brewster angle windows 38 and 42 at input and output resonator regions in those portions of the housing within the optical path. As is well known, a Brewster angle window permits unobstructed passage of radiation therethrough without reflection. Means for dissipating necessary power by removal of electrons from the beam after traversal of the semi-conductor apertures may be provided, for example, by a collector 37 positioned at the end of cavity region 25.

Operation of the embodiment of FIGURE 2 in generating coherent radiant energy in the infrared region, for example at a wavelength of 100 microns, will now be described. The positions of the mirrored surfaces of the resonators surrounding the entry and exit of semiconductor apertures or passages 18, as defined by the direction of travel of the electron beam from source 20 to collector 37, are adjusted in a known manner to produce a resonant wavelength proportional to the desired 100 micron wavelength of the output. Thus a percentage of energy in resonant cavity 25 is transmitted along the optical feedback path comprising input and output resonator mirrored surfaces, as 27, 32, to velocity modulate the electron beam in accordance with the resonant wavelength as set by the resonators. It is to be understood that this resonant wavelength may be continuously varied throughout a region of the spectrum by controlled adjustment of the resonators. The optical phase shifter 31 may be selected, or of an adjustable type, to provide appropriate phase-locking such that self-sustained modulation of the electron beam is maintained. The plasma confined region is cooled to a temperature to maintain mean free collisions of plasma charge carriers at a frequency much lower than the modulation frequency of the traversing electron beams by increasing the mean free collision time far above the normal value of $10^{-14}$ seconds to achieve proper plasma behavior. For radiant energy output having approximately 100 micron wavelength the cooling temperature is maintained close to 4° Kelvin. Difficulty of starting oscillation at such low temperature may be overcome by provision of a starting lamp (not shown) for radiating energy of the desired resonant wavelength through cavity region 25 and thence via the feedback path to modulate the electron beam.

Evacuation of apertures 18 is also provided to permit traversed of the semiconductor "vacant regions" by the electron beams with relatively low collision frequency of the electrons thereof. As the velocity modulated electron beams pass through the semiconductor apertures they tend to set up perturbations in the plasma, thus effecting plasma density variations. The extremely small diameters of and separations between apertures 18 result in close coupling of the near fields of the oscillating plasma and electron beams. Diameters and separations of from approximately ten to twenty microns are sufficient to provide desired coupling, but, of course, coupling is improved as these dimensions are decreased. Where such dimensions can be reduced to the order of 3 microns, defects in the semiconductor lattice structure may occur, but these defects will not prevent proper operation of the plasma. The close coupling of the plasma and electron beam fields gives rise to a set of four coupled space charge waves. Such production of space charge waves resulting from the coupling of appropriate fields is well known, and for a thorough treatment of the mathematical basis of such phenomena reference is made to the multitude of literature on space charge waves and traveling waves, for example Pierce, Traveling Wave Tubes, Van Nostrand (1950). Briefly, the near field coupling produces a set of four propagation constants resulting in four associated waves, one of which is of particular interest, being dominant and having a frequency proportional to the plasma frequency. This wave grows exponentially with distance in the direction of travel of the electron beam. The remaining three waves are respectively a wave attenuating exponentially with distance in the direction of electron beam travel, a wave having no change in amplitude with distance, and a backward wave, all of which may be neglected for purposes of this discussion. By proper selection of the electron beam oscillation or resonant frequency, proportional to velocity modulation, and of the plasma frequency, dependent upon charge carrier density and density perturbations set up by the oscillating electron beams, the wavelength of the coherent radiant energy derived from the growing wave may be controllably varied within a predetermined region of the spectrum and, in particular, within the infrared region. This coherent radiant energy is utilized as an output, for example through window 45, the wavelength of which may be set in accordance with adjustment of the resonators, or continuously varied as previously described. The output is obtained by utilizing only a portion of the radiant energy derived from the growing wave for feedback purposes, and deflecting, for example by conventional optical means (not shown), the remainder in the desired direction of propagation.

Devices in accordance with the present invention may be utilized for purposes of communications, mapping, and guidance, for example. The embodiment of FIGURE 2 which employs simulated transparency of the plasma-carrying medium acts as a source of coherent radiant energy of from approximately 10 to 1,000 microns in wavelength. Temporal coherence and power output of the present invention are comparable to that of gaseous lasers. Further, operation can be set within regions of the spectrum both inside and outside the capabilities of prior art devices.

The generation of coherent radiation having a controllably and continuously variable wave length throughout a predetermined region of the spectrum is dependent, as previously discussed, upon close coupling of the near fields of the plasma and of the electron beam interacting therewith, and upon controlled mobility of electron-hole flow to achieve plasma behavior. In a solid state plasma-carrying medium proper mobility control may require cooling of the medium to increase mean free collision time. The mean free path of the plasma particles in other media may be such that no cooling is necessary. However, the advantages of using solid state rather than gaseous media, for example, lie in an ability to provide extremely high plasma resonance frequencies. Where cooling is necessary, the difficulty of starting oscillation via the feedback path may be overcome by providing a suitable starting device, for example a lamp radiating energy of the desired wave length through the resonant cavity region and thence via the feedback path in the proper phase relationship.

The problem which arises with respect to mean free path of particles within the electron beam is overcome in the present invention by simulating controlled transparency in the semiconducting medium, whereby dense particle beams having relatively high velocity may traverse the "vacant regions" of the semi-conductor with substantially fewer collisions than would otherwise occur. That is, were the particle beam to traverse the plasma, numerous collisions would occur between particles of the interacting beam and plasma which would reduce the desirable high velocity of the beam, as well as cause severe beam spreading.

It may thus be seen that the present invention provides numerous advantages over prior art radiant energy generators, amplifiers, and oscillators, in devices capable of discrete and continuous operation over heretofore relatively unused regions of the spectrum. While a particular embodiment has been described in accordance with statutory provisions, it is obvious that many modifications may occur to persons skilled in the art without departing from the true spirit and scope of the invention. It is therefore desired that the present invention be limited only by the appended claims.

I claim:
1. In a coherent radiant energy source, the combination comprising
   a solid state material,
   a plasma having a predetermined density of charge carriers confined within said solid state material,
   said solid state material having a plurality of passageways extending therethrough for simulating vacant regions within said plasma,
   means for generating a beam of charge-carrying particles,
   means for directing said beam of particles through said plurality of passageways to permit close coupling of the near fields of said beam and said plasma,
   variable voltage source means connected across said material for effecting a drift of said plasma charge carriers therethrough in a direction parallel to said passageways,
   first resonator means for receiving wave energy produced along said beam in response to intercoupling of the near fields of said beam and said plasma as said beam travels along said passageways,
   second resonator means for applying wave energy to said beam prior to entry into said passageways,
   means for feeding back a portion of the wave energy from said first resonator means to said second resonator means to velocity modulate said beam in accordance with the frequency of the coherent energy to be radiated,
   at least one of said resonator means being variable to selectively control said frequency, and
   means for extracting radiant energy of said frequency from said first resonator means.

2. The combination according to claim 1 wherein said resonating means includes a resonant cavity, and a plurality of adjustable optical first resonator for producing oscillation of said wave energy within said cavity.

3. The combination according to claim 1 wherein said means for feeding back includes means for reflecting a portion of said wave energy from said first resonator means along a predetermined optical path for application to said second resonator means, said optical path having phase-shifting means located therein for producing sustained velocity modulation of said beam.

4. The combination according to claim 1 including means for cooling said solid state material to decrease the mean collision frequency of said charge carriers.

5. The combination according to claim 1 including means for forming a vacuum within said plurality of passageways to decrease the mean collision frequency of said charge carrying particles in said beam.

6. In a source for radiating energy at a frequency within the infrared region of the electromagnetic spectrum, the combination comprising
   a semiconducting medium substantially confining a plasma having a predetermined density of charge carriers therein, said medium further having a plurality of parallel passageways extending therethrough in accordance with a predetermined pattern;
   an electron gun for directing a beam of electrons through said passageways,
   means for establishing an electrostatic field across said medium having lines of force substantially parallel to said passageways,
   a set of Fabry-Perot resonators each having opposed mirrored surfaces of approximately 98 percent reflectance, said mirrored surfaces defining a resonant cavity at each end of said medium in a direction orthogonal to said passageways,
   an electron collector within the cavity adjacent the end of said medium from which electrons in said beam egress said passageways, to prevent reflection of said electron beam back through said passageways, and
   an optical feedback path having reflective means therein for coupling a portion of the energy resonating in the last-named cavity to the other cavity in a favorable phase relationship to provide sustained modulation of said beam, and thereby, intercoupling of the near fields of said modulated beam and said plasma to produce radiant energy at said infrared frequency.

7. An energy radiator comprising
   a semiconductor body containing a plasma having a homogeneous distribution of charge carriers; said body having a longitudinal axis and a plurality of apertures extending longitudinally through said body parallel to said axis,
   means for producing a charged particle beam,
   means for aligning and directing said beam through said apertures, said apertures having diameters of less than 20 microns and being separated from each other by regions of said semiconductor body of less than 20 microns thickness,
   means for establishing an electric field longitudinally through said semiconductor body to produce a drift of said charge carriers through said semiconductor body,
   a pair of optical resonators respectively positioned adjacent the ends of said semiconductor body,
   feedback means coupling said optical resonators to supply energy emanating from said apertures and resonated in the optical resonator adjacent the end of said semiconductor body at which the charged particles in said beam emerge from said apertures to the optical resonator adjacent the end of said semiconductor body at which the charged particles in said beam enter said apertures, for velocity modulating said beam,
   said modulated beam producing perturbations in said plasma at a frequency proportional to said modulation as said apertures are traversed by said beam, whereby a growing wave of radiant energy is produced in the direction of said beam as a result of interaction between said separated beam and plasma, and
   means for extracting a portion of said radiant energy from said optical resonator adjacent the end of said semiconductor body from which said charged particles emerge.

8. The combination according to claim 7 wherein said particle beam is an electron beam.

9. The combination according to claim 8 wherein at least one of said optical resonators is adjustable to vary the wavelength of said radiant energy, and wherein said feedback means includes an optical path and an optical phase shifter located in said optical path to control the phase relationship of radiant energy coupled between said resonators to produce sustained modulation of said electron beam.

10. The combination according to claim 7 including means for cooling said medium to decrease the mean collision frequency of said charge carriers.

11. The combination according to claim 7 including means for providing a vacuum within said apertures to decrease the mean collision frequency of charged particles of said beam.

References Cited

UNITED STATES PATENTS 3,099,768    7/1963    Anderson _____ 331—41 X
3,274,507    9/1966    Weimer et al. _____ 315—3 X JEWELL H. PEDERSEN, *Primary Examiner.*

RONALD L. WIBERT, *Assistant Examiner.*